A. PAIGE & G. WILKINSON.
Fruit-Drier.
No. 130,861.  Patented Aug. 27, 1872.
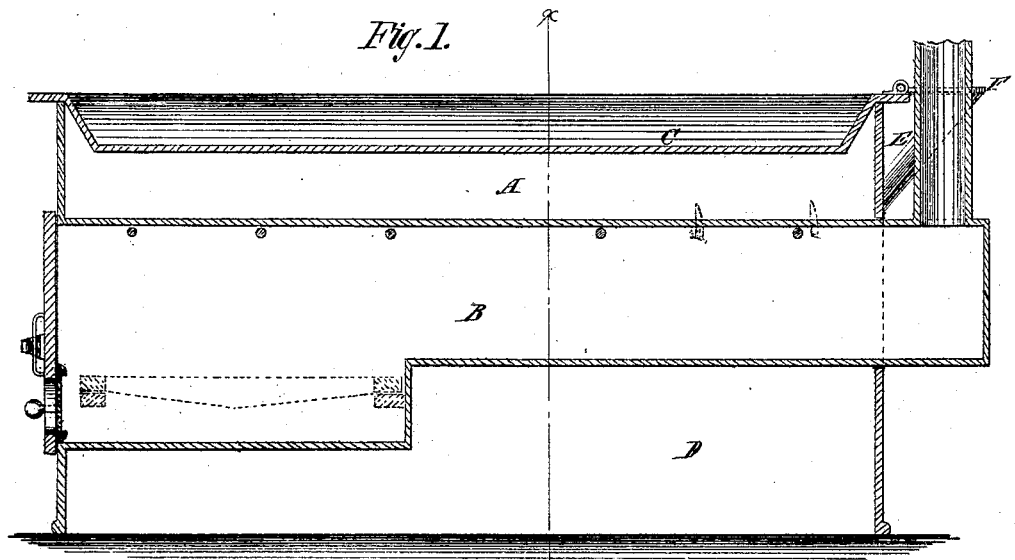
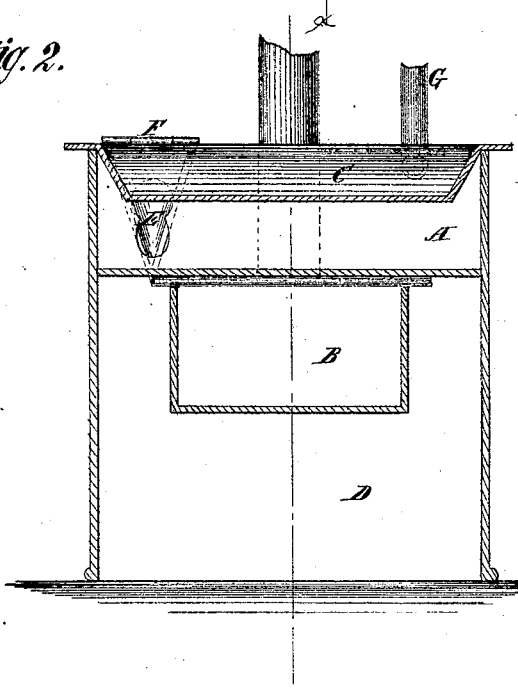
Witnesses:
P. C. Dieterich
Francis McArdle
Inventor:
A. Paige
Geo. Wilkinson
per
Attorneys.

UNITED STATES PATENT OFFICE.

ALBERT PAIGE AND GEORGE WILKINSON, OF CHICAGO, ILLINOIS.

IMPROVEMENT IN FRUIT-DRIERS.

Specification forming part of Letters Patent No. 130,861, dated August 27, 1872.

*To all whom it may concern:*

Be it known that we, ALBERT PAIGE and GEORGE WILKINSON, of Chicago, in the county of Cook and State of Illinois, have invented a new and useful Improvement in Renovating Fruit; and we do hereby declare that the following is a full, clear, and exact description thereof, which will enable others skilled in the art to make and use the same, reference being had to the accompanying drawing forming a part of this specification.

Our invention consists in an improvement upon the usual means of drying fruit, as hereinafter fully described and subsequently pointed out in the claim.

Figure 1 is a longitudinal sectional elevation of apparatus which we employ for treating the fruit; and Fig. 2 is a transverse section of said apparatus, the section being taken on the line $x\ x$ of Fig. 1.

Similar letters of reference indicate corresponding parts.

We propose to employ water for transmitting the heat to the fruit, berries, &c., to be treated, the water being converted into steam or not, according to the degree of heat required, because of the uniformity with which the heat can be thus applied, and, also, because it is not so liable to be raised to such a degree as to burn the fruit under treatment.

To this end we provide a water-pan, A, over a heater, B, steam-tight, and a fruit-pan, C, over the water-pan. Preferably, the heater will be inclosed in a large case, D, for conferring the heat to the bottom of the water-pan. The latter will have a water-supply spout, E, with a steam-tight fitting cover, F, and an escape-pipe, G, for the steam, with any suitable device for regulating or checking the escape of steam.

We place the fruit in the pan C and subject it to the action of the heat connected by the water or steam in pan A, as the case may be, for a long or short time and a low or high degree of heat, according to the conditions and requirements of the fruit under pressure.

Whether the heat be high or low it is applied in the same degree under all parts of the pan A, giving very much better results than the heat of the fire directly applied.

Having thus described our invention, what we claim as new, and desire to secure by Letters Patent, is—

The combination, with a fruit-pan, C, of a steam-generator, A, having steam-tight valve-spout E F and a heater, B, confined in a heat-retaining case, D, and coming only in contact with the bottom of the generator, whereby the fruit may be steamed and a high heat continuously applied until insects are wholly destroyed, while the evenness of temperature in steam prevents any injury to the fruit and allows all parts of it to become uniformly permeated with the heat.

ALBERT PAIGE.
GEORGE WILKINSON.

Witnesses:
WM. L. ABBOTT,
W. F. FURBREK.